US011966497B2

(12) United States Patent
Eneim et al.

(10) Patent No.: US 11,966,497 B2
(45) Date of Patent: Apr. 23, 2024

(54) DATA PRIVACY MANAGEMENT BASED ON CONDITIONAL THRESHOLDS

(71) Applicant: MOTOROLA SOLUTIONS, INC., Chicago, IL (US)

(72) Inventors: Maryam Eneim, Boca Raton, FL (US); Joseph Namm, Plantation, FL (US); Karl F Mueller, Sunrise, FL (US); Lee Michael Proctor, Cary, IL (US); Peter H Mills, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 351 days.

(21) Appl. No.: 17/449,831

(22) Filed: Oct. 4, 2021

(65) Prior Publication Data
US 2023/0108263 A1 Apr. 6, 2023

(51) Int. Cl.
*G06F 21/00* (2013.01)
*G06F 9/451* (2018.01)
*G06F 21/62* (2013.01)

(52) U.S. Cl.
CPC .......... *G06F 21/6254* (2013.01); *G06F 9/451* (2018.02)

(58) Field of Classification Search
None
See application file for complete search history.

(56) References Cited

U.S. PATENT DOCUMENTS

| | | |
|---|---|---|
| 8,401,875 B2 * | 3/2013 | Fish ..................... A61B 5/0002 705/3 |
| 8,832,301 B2 | 9/2014 | Graff et al. |
| 8,832,796 B2 * | 9/2014 | Miyake ............... G06F 21/6218 455/566 |
| 9,128,773 B2 * | 9/2015 | Beaty .................. G06F 11/3006 |
| 9,401,086 B2 * | 7/2016 | Basalamah .......... G08G 1/0112 |
| 9,681,360 B1 * | 6/2017 | Salyers ................. H04W 12/64 |
| 10,388,096 B2 | 8/2019 | Bruce et al. |
| 10,432,621 B2 * | 10/2019 | Vo ........................... G06F 21/31 |
| 10,476,884 B2 | 11/2019 | Hall et al. |
| 2015/0039338 A1 | 2/2015 | Tregnaghi |
| 2016/0300931 A1 | 10/2016 | Fu et al. |
| 2019/0104596 A1 | 10/2019 | Hartog et al. |
| 2020/0104951 A1 | 4/2020 | Krajcev et al. |
| 2020/0286400 A1 | 9/2020 | Jackson |

FOREIGN PATENT DOCUMENTS

WO 2019086553 A1 5/2019

* cited by examiner

*Primary Examiner* — Maung T Lwin
(74) *Attorney, Agent, or Firm* — Barbara R. Doutre

(57) ABSTRACT

A portable communication device, method, and system enable temporary access to private user information by a venue communication system. The temporary access to the private information is based on a registration that includes user selectable privacy thresholds and predetermined venue conditions. The temporary access by the venue communication system can be adjusted and limited by the portable communication device. The usage of the private data by the venue communication system may be limited to anonymous analytics and/or extended to non-anonymous analytics and notifications based on user input to the communication device.

17 Claims, 4 Drawing Sheets

DATA PRIVACY MANAGEMENT BASED ON CONDITIONAL THRESHOLDS

BACKGROUND OF THE INVENTION

Personal data and privacy practices used to protect personal data are continually evolving. The impact of large scale health concerns has presented challenges to preserving privacy. The COVID-19 virus was the cause of a global pandemic, which affected people worldwide. Government-issued lockdowns, self-imposed lockdowns, cancellation of large and small events, curfews, reduced in-building capacity, social distancing, and mask mandates were just a few of the limitations imposed to protect the public. With the advent of vaccines, restrictions began to ease, however events which attract large groups of people remain a concern. Concerts, festivals, conferences, sport events are just a few examples of venue types where there is still a strong desire to provide protective measures to ensure the health and well being of attendees. Balancing the desire to return to large venue type events needs to be balanced with individual privacy concerns.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
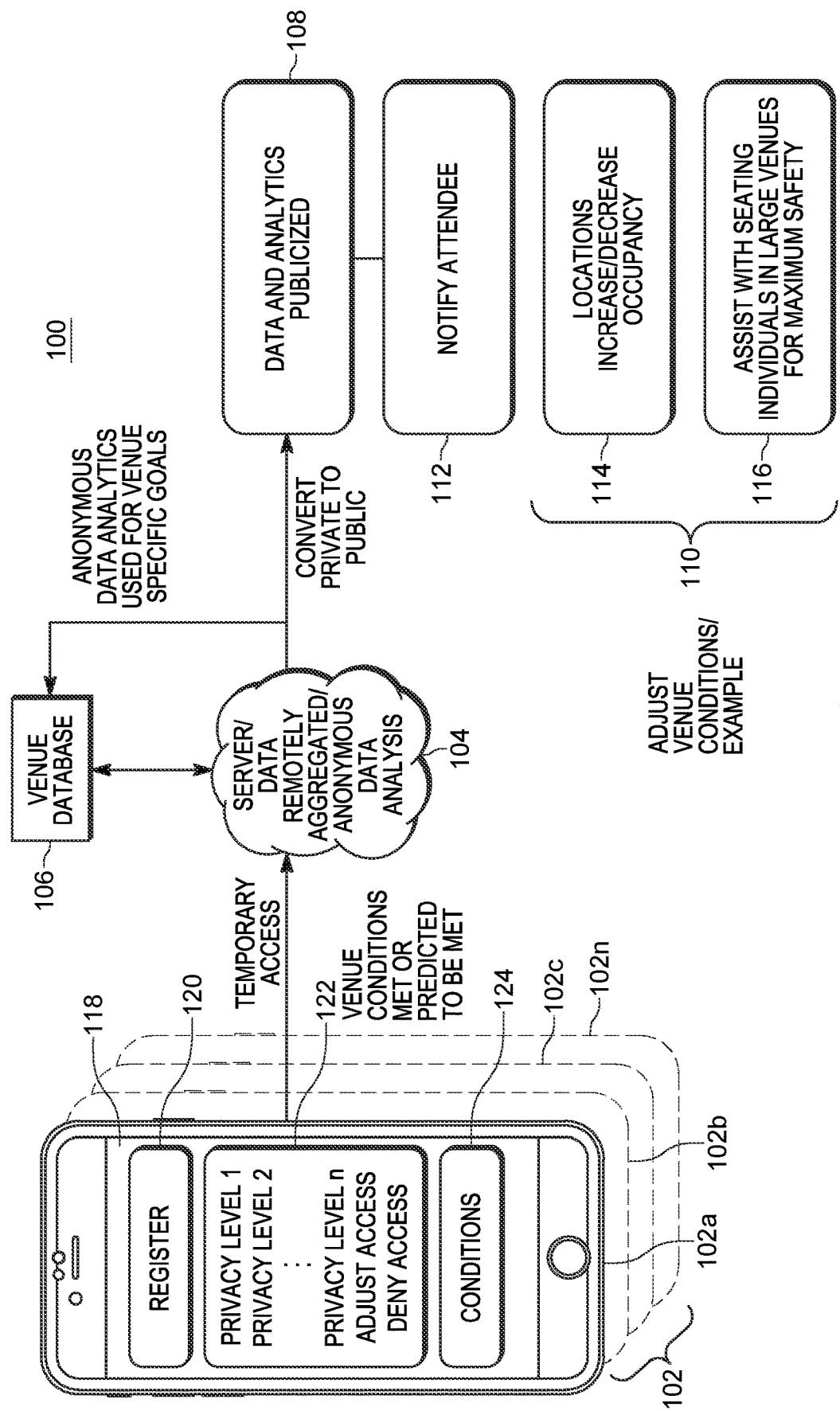
FIG. 1A is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a communication system and method which enable collaborative engagement between a portable communication device and a venue to further venue related goals of health and public safety. Registration of the portable communication device with the system provides for a plurality of user selectable data privacy thresholds being presented at each device. Each data privacy threshold is set to enable different levels of temporary access to private user attendee information, such as demographic information and/or health information of the user attendee, by the communication system. The temporary access is granted based on predetermined venue conditions, such as maximum capacity conditions, environmental conditions, seating capacity, mask mandates, distancing requirements, and/or other predetermined contextual conditions associated with the venue. When the predetermined venue conditions are predicted to be met, and/or are meet, then anonymous analytics are performed on the temporarily accessed private user attendee information. The anonymous analytics of the private user attendee information are used to further venue related goals, such as managing occupancy of the venue, managing crowd density within locations of the venue, promote social distancing, and/or other venue related goals. Additional permissions may be granted allowing access to an individual's private user attendee information for public use in both venue related goals and public venue notifications.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1A is a block diagram of a communication system 100 formed and operating in accordance with some embodiments. Communication system 100 comprises a plurality of portable communication devices 102, individually referred to as portable communication devices 102a, 102b, 102c, . . . 102n, being operated by different user attendees of a venue. The portable communication devices 102 may comprise one or more of a cell phone, a tablet, a smart watch, or other battery powered communication device operated by a user attendee. The venue may be, for example, a stadium, museum, classroom, theatre, exhibit, lecture hall, movie theatre or other venue where people temporarily gather. The communication system 100 comprises a server 104, and a database associated with the venue, also referred to as a venue database 106.

In accordance with the embodiments, the server 104 may comprise a cloud based server operating under microprocessor control, the microprocessor being configured to: register at least one portable communication device, such as device 102a, but preferably the plurality of portable communication devices 102, within the venue or prior to entry to the venue. The portable communication devices 102 and server 104 communicate wirelessly. The server 104 is communicatively coupled to, and writes data to and from, the venue database 106 using either wired or wireless communications. In some embodiments, all or part of the venue database 106 may be locally stored on the server 104. The venue database 106 may store a venue registration system which the server 104 can use for registering the portable communication devices 102 with the communication system 100. The venue database 106 further stores venue conditions, venue thresholds, and venue goals with which the server 104 can use for performing venue data analytics.

The communication system 100, including the plurality of registered portable communication devices 102, server 104, and venue database 106, may interoperate using, for example, a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof.

Registration of the plurality of portable communication devices 102 with the server 104 may be accomplished using the registration system associated with the venue database 106. For example, a QR code, authentication file, software application, email, texting service, or other registration means may be sent to each portable communication device for registering with the server 104. Software applications may be downloaded from, for example, a Google Play store or an Apple App store, and may be generic event management applications or specific to the particular venue. In accordance with the various embodiments, the registration system provides a plurality of user selectable data privacy thresholds which enable server access to the private user attendee information of each portable communication device based on predetermined venue conditions. Attendee users registering their respective devices with the venue communication system 100 are advantageously able to allow full access, limited access, adjustable access, and even deny access to their private information stored within their respective devices 102a, 102b, 102c, 102n. The user registration may further include a user selectable option to grant or deny permission to make an individual's private information public and/or to grant permission to make an individual's private information public based on the same or additional predetermined venue conditions being met.

In accordance with some embodiments, the server 104 is configured to temporarily collect private user attendee information in response to the registration's selected privacy levels and predetermined venue conditions. The server 104 further aggregate and performs anonymous data analytics on the temporarily accessed private user attendee information for venue specific goals. The server 104 may temporarily store the private user attendee information and analytics in venue database 106. The anonymous data analysis can be utilized for venue specific goals.

The private user attendee information may comprise demographics and health status of each registered attendee. For example, demographics associated with an attendee may comprise age, sex, education, nationality, ethnicity, or religion, to name a few, and health status information may comprise vaccination status, pre-existing health conditions, disabilities, mobility concerns, and allergies, to name a few. The private user attendee information may be collected and aggregated for anonymous data analytics associated with the venue goals (for example goals pertaining to contextual venue conditions such as seating capacity, spacing, entrance and exit routes, and mask mandates, to name a few). Based on the anonymous analytics, locations within the venue can be identified for optimized safe movement of individuals entering, moving, seating, and exiting throughout the venue. The system can assist with identifying optimal seat assignments, such as for social distancing, vaccination status, susceptible age groups, and the like. For example, the system can, based on initial anonymous analytics, determine venue seating arrangements without identifying specific individuals. For example, the analytics may indicate that a certain percentage of the attendees are vaccinated or non-vaccinated, and generate an optimized spacing recommendation for seating. Individuals will be seated in accordance with determined optimized spacing for the percentage thereby maintaining a desired spacing ratio, without identification of individuals and without publicizing individual private data. If further venue conditions (could be the same with different threshold or different) are met, such as, for example, an age demographic indicating a large percentage of elderly attendees, then venue system is provided with personally identifying information at which point user specific directions or procedures can be sent to the user. For example, individuals determined to be high risk (based on vaccination status and age) may be assigned seats which are spaced further apart. Hence, when the initial venue conditions are met, the venue system can use the aggregated data. If further conditions (could be the same with different threshold or different) are met, then venue system is provided with personally identifying information at which point user specific directions or procedures can be sent to the user.

In accordance with some embodiments, the server analytics may further determine, based the user registration, selected privacy levels and the predetermined venue conditions, that the data analytics and/or temporarily accessed private user attendee information shall be converted to non-anonymous public data 108. For example, a user registering device 102a may have opted to permit their private information to be made public, and/or to permit the analytics pertaining to their information to be made public, and/or to permit some of their user information and/or come of their analytics to be made public.

The server 104 may further send a notification 112, to the plurality of portable communication devices 102 registered with the venue, pertaining to the non-anonymous data that had granted permissions associated therewith. The attendees registering with the venue communication system 100 are beneficially able to control the temporary access to their private information via their respective communication devices as described next.

From the viewpoint of the plurality of portable communication devices 102, each portable communication device 102a, 102b, 102c, 102n comprises a microcontroller (not shown), and a user interface 118, such as a touch screen, operatively coupled to the microcontroller. A registration field 120 may be generated at the user interface, such as QR code or other registration notification, allowing the device to communicate with the server 104 so as to register with the registration system associated with the venue database 106.

In accordance with the embodiments, in response to registering the device 102 with the server 104, the user interface 118 provides a plurality of user selectable data privacy thresholds 122, each data privacy threshold being set to enable temporary access to different levels of private user information by the venue communication system, the temporary access being granted based on predetermined venue conditions 124 associated with the venue. The plurality of user selectable data privacy thresholds 122 may also provide options for adjusting or denying access to a user's private information thereby limiting or extending the private user information being accessed by the venue communication system.

In accordance with some embodiments, the predetermined venue conditions 124 presented to the user interface 118 may comprise one or more of: predetermined venue conditions predicted to be met and/or predetermined venue conditions being met. For example, the predetermined venue conditions of crowd density and/or environmental conditions of the venue may be predicted to be met and/or already met.

The registration may further provide selectable permissions limiting the use of private data for anonymous analytics and/or conversion of the anonymous data to public data. The permissions may include at least one of: a first permission threshold allowing access to the private user data for anonymous analytics for use in venue related goals only, and a second permission threshold permitting access to the private user data for public use in both venue related goals and public venue notifications.

The predetermined venue related goals and predetermined venue conditions may be communicated from the server 104 to the plurality portable communication devices 102 via each device's user interface 118, allowing each user attendee to make informed decisions as to the selection of their respective privacy thresholds. The venue related goals may pertain, for example to managing occupancy of the venue, and/or managing crowd density within locations of the venue. For example, the venue may have a goal of maintaining social distancing via recommended seating for vaccinated individuals wearing a mask, unvaccinated individuals wearing a mask, and unvaccinated individuals not wearing a mask.

In some embodiments, the server 104 also includes software and hardware to electronically detect and classify the private information received from the portable communication device 102. In some embodiments, the aggregated private data is temporarily stored in the venue database 106, for example for the duration of an event taking place at the venue. The private user information accessed by the server 104 is aggregated for anonymous venue data analytics. For example, the predetermined venue conditions reaching a first venue condition may enable the private user attendee information to be accessed for anonymous analytics by the server 104, and the predetermined venue conditions reaching a second venue condition threshold may enable the private user attendee information to be converted to non-anonymous data for user notifications. As an example, a user can specify that their data cannot be used until there are or predicted to be, a predetermined number of attendees (e.g. 1000 attendees) at an event. When there are expected to be over one thousand attendees, the user agrees that their vaccination status can be used for general analytics. The user can further specify a second threshold (e.g. 10,000 attendees) where the user agrees that they can be notified by the venue system. This level of permission requires that their personal contact information be made public. The notification may include an overall vaccination rate and optionally actions the user can take (e.g. cancel their attendance due to predicted high crowd density and low vaccination rate). As another example, the system may inform the user attendee within the venue that the density in their current assigned area may exceed a user specified threshold, and the venue system may offer an alternate seat to the user attendee. In this case, the user attendee has been rewarded for allowing access to their private information and permission to notify them, by being granted an improved seating assignment, along with maintaining the overall health and welfare at the venue.

Figure 1B:
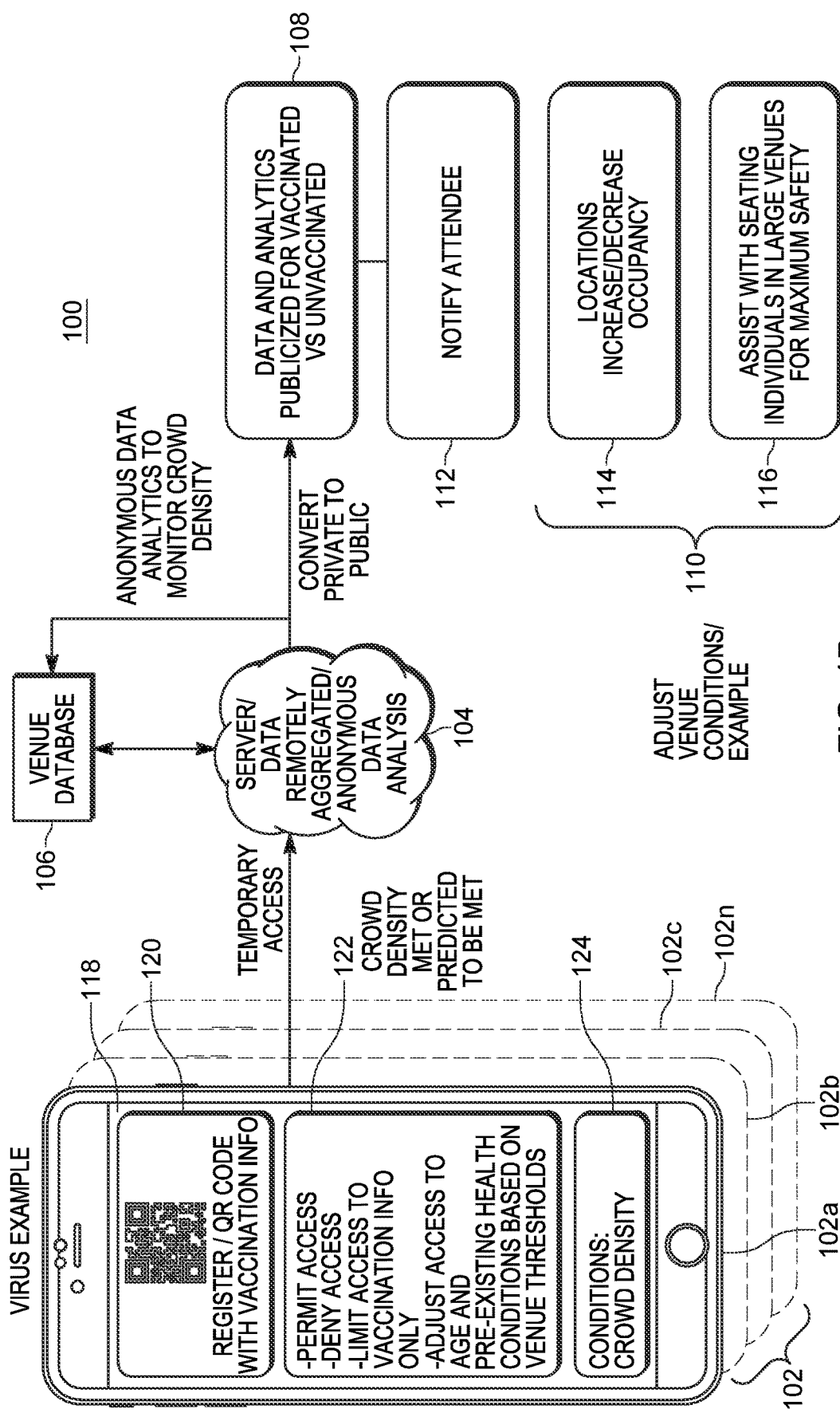
FIG. 1B is an example embodiment of FIG. 1A in accordance with some embodiments.

FIG. 1B is an example embodiment of the communication system of FIG. 1A in accordance with some embodiments. In this example embodiment, a venue is managed via the venue communication system 100 seeking to use private data of attendees pertaining to vaccination status in order to recommend and/or perform actions which will optimize use of the venue for the safety and welfare of the attendees.

In this example the communication system 100 comprises the plurality of portable communication devices 102, individually referred to as portable communication devices 102a, 102b, 102c being operated by different user attendees entering the venue or already present within the venue. Each user attendee has stored their respective individual vaccination status and some have stored their demographic information. For example, a QR code, private contact file, or the like, may be used to store each user's private information on their device. The private vaccination information and demographics can be scanned or otherwise acquired as part of the communication system's registration process with the server 104 and venue database 106. Alternatively, each portable communication device may transmit its private data to the server in response to an indication that the venue thresholds have been met/predicted to be met. The server's microprocessor is configured to register the plurality of portable communication devices 102 using the registration system associated with the venue database 106.

As part of the registration process, each portable communication device is provided, from server 104, with a plurality of user selectable data privacy thresholds at user interface 118. Each data privacy threshold is set to enable a different level of temporary access to each user's private user information for use by the venue communication system, the temporary access being granted based on predetermined venue conditions being met or predicted to be met.

When, for example, a predetermined crowd density threshold condition has been reached or is predicted to be reached, the server 104 can gain access to the private user information to the limits permitted by the selected thresholds, and begin anonymous analytics thereon. The server 104 may collect, for example, vaccination status information from each device that has granted permission. For example, device 102a may have limited its' access to vaccination information only, while device 102b may have permitted access to its' vaccination information as well as other demographic information, such as age and religion, and further permitted access other heath related information, such as pre-existing health conditions. The user of device 102b may have conditioned the server's access so that additional demographic information may be accessed based on a higher level of access threshold, than the vaccination information. Device 102c may have permitted access to all of its' private information as pertains to venue specific goals. Other devices may have permitted temporary access to their demographic information but not their vaccination status. Other devices may have denied access to their private information completely.

The data is collected and aggregated by the server 104 to generate anonymous analytics pertaining to the attendees. The anonymous data analytics generated by server 104 may facilitate with crowd density management by venue organizers by, for example, determining a current vaccination percentage for a given location within a venue. The communication system 100 allows venue organizers to advantageously establish an optimized seating arrangement for all attendees, while still preserving each individual's privacy. The seating and spacing can be assigned across all attendees without divulging any of their private information.

For devices which permitted their data to be used publicly, the venue data analytics pertaining to vaccinated vs. unvaccinated status may be made public along with the analytical results. This permits for even greater adjustability and optimization of occupancy and seating plan conditions 110. For example, individuals who have been vaccinated can be seated closer together with less social distancing, while those whom have not been vaccinated can be spaced further apart. Notifications 112 can be sent to the plurality of devices which accepted public notification along with recommendations for increased/decreased occupancy within locations of the venue 114 and assigned seating recommendations 116.

Figure 2:
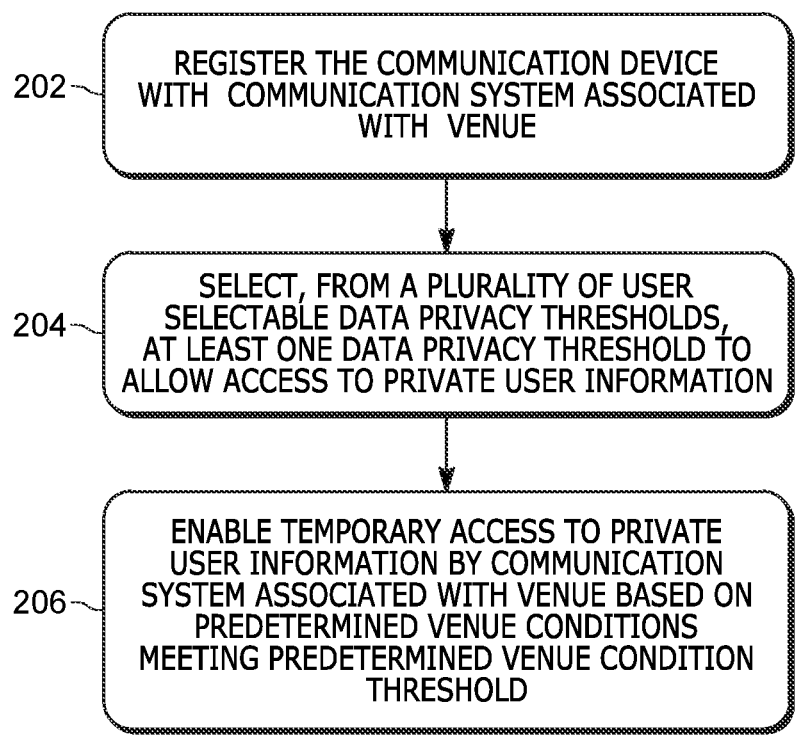
FIG. 2 is a flowchart of a method for managing data privacy on a communication device in accordance with some embodiments.

FIG. 2 is a flowchart of a method 200 for managing data privacy on a communication device in accordance with some embodiments. Method 200 begins at 202 by registering a portable communication device with a communication system, the communication system being associated with a venue. For example, the communication device 102a of FIG. 1 may register, via the user interface 118 of the device, with the he server 104 in accordance with a registration system associated with venue database 106 as depicted in FIG. 1. The registration may be achieved by loading an app, QR code, or other venue registration means.

The method continues at 204 with selecting, from a plurality of user selectable data privacy thresholds 122 presented to a user interface of the portable communication device, at least one data privacy threshold allowing access to private user information, associated with the attendee user of the portable communication device. For example, as was seen in FIGS. 1A and 1B the plurality of user selectable data privacy thresholds 122 may include but are not limited to: permit full access, limited access, adjustable access, and even deny access to private information stored within each respective device. The private user information associated with an attendee may include various demographics of an attendee and health status parameters of an attendee, to name a few. If a user denies access to their private information, irrespective of the venue conditions, the device may still be registered so that a headcount may be taken, but no access is provided to private information associated with the device. If the venue permits unregistered devices (or individuals without devices) to be admitted to the venue, then a ticket count, head count, or the like can be used. The venue system may opt to consider attendees without devices or having unregistered devices as worst case scenario data for the purpose of analytical processing to provide the venue with additional safety precautions.

The plurality of user selectable data privacy thresholds of 204 preferably further comprises at least one of: a first permission threshold allowing access to the private user data for anonymous analytics for use in venue related goals only, and a second permission threshold allowing access to the private user data for access to the private user data for non-anonymous use in both venue related goals and public venue notifications.

The method continues at 206 by enabling temporary access to the private user information by the communication system associated with the venue. In accordance with the embodiment, the temporary access is based on at least one predetermined venue condition. The predetermined venue conditions of 206 preferably comprise at least one of: predetermined venue conditions predicted to be met, and/or predetermined venue conditions being met. The predetermined venue conditions may be presented to the user interface of the communication device (such as user interface 118 displaying conditions 124 in FIG. 1A) so that the user of the device remains informed as to the venue conditions of interest. The predetermined venue conditions preferably comprise at least one of: crowd density conditions of the venue, and environmental conditions. Additional predetermined venue conditions may be included depending on the type of event taking place and the system's permitted access to health status and demographic information of the user attendees to promote the health and welfare within the venue. For example, venue organizers may find it beneficial to know if there are a high number of predicted attendees with mobility issues if a storm is approaching. Notifications may be received at the portable communication devices that agreed to make their private data public at 204.

Figure 3:
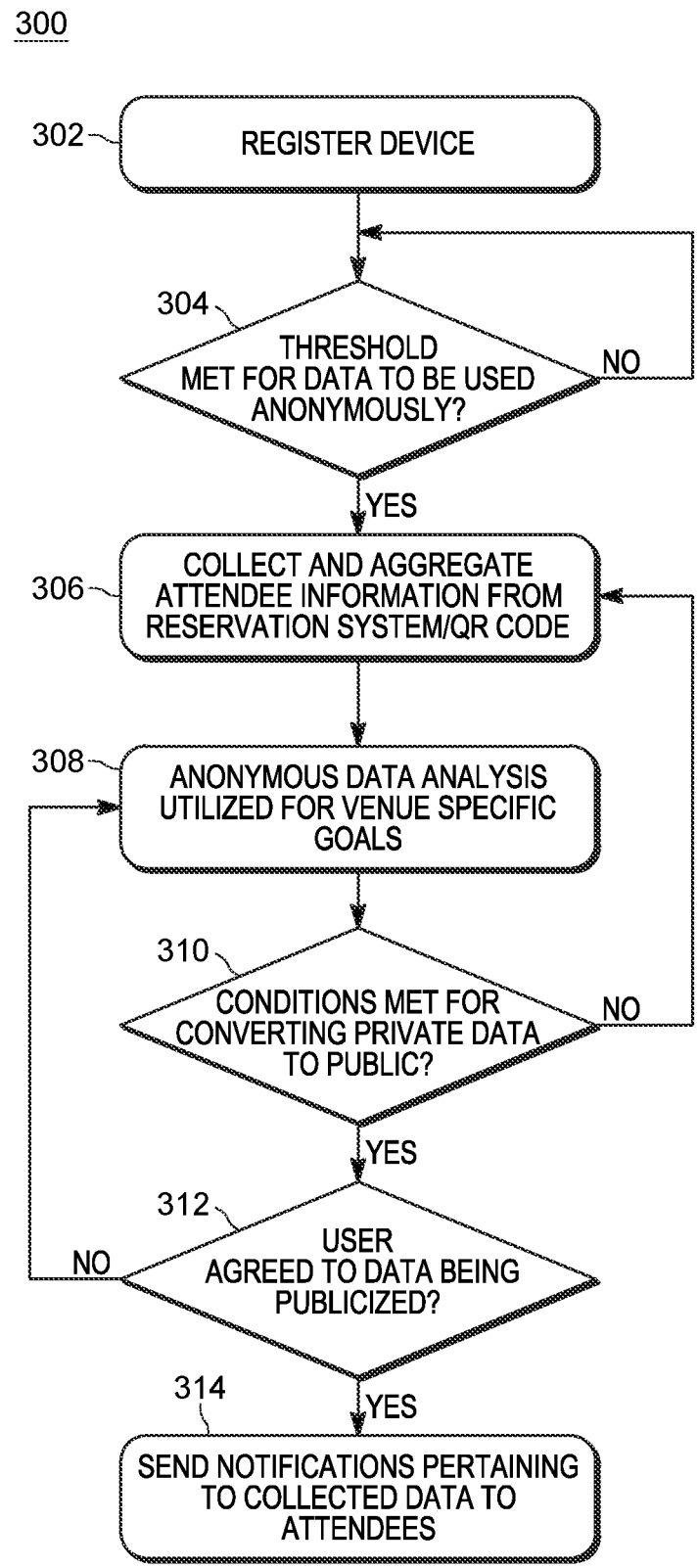
FIG. 3 is a flowchart of a method for managing data privacy in a communication system in accordance with some embodiments.

FIG. 3 is a flowchart of a method 300 for managing data privacy in a communication system, such as the communication system of FIG. 1A and FIG. 1B, in accordance with some embodiments. Method 300 is viewed from the vantage point of the overall communication system with most steps being managed by a microcontroller of the server. Beginning at 302, the server registers one or more portable communication device(s) with the venue communication system. For example, the server may receive registration requests from one or more devices via QR codes, mobile apps, or other registration means. As part of the registration process, the server determines whether access to a user attendee's private data has been granted, denied, or limited in response to the user's input to user selectable data privacy thresholds, and where access to that data is based on venue specific goals. The registration may further include determining whether private data can be made public at a later stage of processing.

At 304, the server determines whether the venue conditions has/have been met or that the venue conditions is/are predicted to be met, thereby permitting temporary access to an individual's private data for anonymous analytics pertaining to the venue goals. If venue conditions have not been met or have not been predicted to be met at 304, then the method waits until such conditions are met.

If the venue conditions have been met or predicted to be met at 304, then the server collects and aggregates the private attendee information from the reservation code system or QR code at 306. The private attendee information may be obtained by accessing the original registration information, where the privacy limits where set by the selected privacy thresholds. Alternatively, each portable communication device may transmit its' private data to the server in response to an indication that the venue conditions have been met/predicted to be met. Private data can be collected and aggregated for a plurality of portable communication devices that have registered with the venue in accordance with each respective device's privacy access level.

Anonymous data analysis of the private data take place for the venue specific goals takes place at 308. Such goals might include for example seating capacity and social distancing for masked, unmasked, vaccinated and non-vaccinate attendees of the venue to maintain the health and safety of the attendees.

At 310, venue conditions are checked to determine if the private data and analytics pertaining thereto can be converted to public data. The venue conditions may be the same venue conditions from 304 now reaching a new threshold and/or different venue conditions being met. For example, the initial venue conditions may be venue conditions pertaining to seating capacity and distancing which may be approaching a new crowd density threshold, and/or a new venue condition pertaining to crowd density for different environmental conditions, such as bad weather, which may be approaching a predetermined crowd density/weather threshold. If a user attendee, during registration, denied permissions to make their private information public, then the method returns to 306 to continue collecting information and performing anonymous analytics for venue specific goals, without conversion to public data. If, on the other hand, a user attendee granted permission to make their individual private information public based on additional predetermined venue conditions being met (or a higher threshold of a previous condition being met), then the method continues to 312 to verify that permissions (either conditional or without conditions) are satisfied to further ensure privacy protections. If there is any discrepancy in the permissions, then the method will not publicize private data and limit analysis to anonymous analytics by returning to 308.

Verification of a user attendee's agreement to have their private data publicized at 312 (either conditionally or non-conditionally) results in notifications pertaining to the collected data and analytics being sent from the server to the portable communication devices of the venue attendees at 314. Again, if a user attendee has not agreed to their private data being publicized then the method returns to 308 to continue with the anonymous data analytics which will remain anonymous and used only for venue specific goals. In other words, an individual can register a device with the system and agree to have anonymous data analytics performed to facilitate venue goals, but still decline to having their private data published.

The embodiments facilitate a venue's ability to maintain the health and welfare of attendees. The embodiments permit the tracking of venue conditions where those venue conditions being met permit access to a user's private information Venue dynamics can be modified in response to the attendee information, while the privacy thresholds selected by individuals can be maintained and/or adjusted. Public notifications can be generated when appropriate permissions have been granted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
a microcontroller; and
a user interface operatively coupled to the microcontroller, the microcontroller being configured to:
receive a registration request, as part of a venue registration, to register the portable communication device with a venue communication system associated with a venue;
receive, from the venue communication system and as part of the venue registration, a plurality of user selectable data privacy thresholds, each data privacy threshold being set to enable a different level of access to a user's private user information for use by the venue communication system, the access being granted based on predetermined venue conditions;

present the plurality of user selectable data privacy thresholds to the user interface for user selection; and enable, in response to the user selection and the predetermined venue conditions, the temporary access to the private user information by the venue communication system for aggregated anonymous venue analytics.

2. The portable communication device of claim 1, wherein the user interface presents the venue registration for registering the portable communication device with the venue communication system.

3. The portable communication device of claim 1, wherein the predetermined venue conditions are presented to the user interface.

4. The portable communication device of claim 3, wherein the predetermined venue conditions presented to the user interface comprise at least one of:
predetermined venue conditions predicted to be met; and
predetermined venue conditions being met.

5. The portable communication device of claim 1, wherein the plurality of user selectable data privacy thresholds comprise at least one of:
a first predetermined threshold permitting temporary access to the private user information for anonymous analytics for use in venue related goals; and
a second predetermined threshold permitting access to the private user information for public use in both venue related goals and public venue notifications.

6. The portable communication device of claim 1, wherein the user interface presents a user selectable option to deny access to the private user information.

7. The portable communication device of claim 1, wherein the user interface presents user adjustability to the user selectable data privacy thresholds to limit the private user information being accessed by the venue communication system.

8. The portable communication device of claim 1, wherein the predetermined venue conditions comprise at least one of:
crowd density within locations of the venue; and
environmental conditions of the venue.

9. A method for managing data privacy of a portable communication device, comprising:
registering the portable communication device with a communication system associated with a venue;
receiving, from the communication system, a plurality of user selectable data privacy thresholds;
selecting, from the plurality of user selectable data privacy thresholds, at least one data privacy threshold allowing temporary access to private user information based on predetermined venue conditions;
enabling temporary access to the private user information by the communication system associated with the venue, the temporary access being granted based on the selected data privacy threshold and the predetermined venue conditions, the temporary access being granted further enabling data analytics for venue related goals by the communication system; and
detecting that a first data privacy threshold has been met which permits anonymous data analytics to be utilized for the venue related goals.

10. The method of claim 9, wherein the predetermined venue conditions comprise at least one of:
predetermined venue conditions being met; and
predetermined venue conditions predicted to be met.

11. The method of claim 9, wherein the plurality of user selectable data privacy thresholds comprise at least one of:
a first predetermined threshold permitting access to the private user information for anonymous analytics for use in venue related goals; and
a second predetermined threshold permitting access to the private user information for non-anonymous use in both venue related goals and public venue notifications.

12. The method of claim 9, further comprising:
detecting that a second data privacy threshold has been met which permits converting the private user information from anonymous data to non-anonymous data; and
sending notifications to the portable communication device pertaining to the non-anonymous data.

13. The method of claim 12, wherein the venue related goals comprise at least one of:
managing occupancy of the venue; and
managing crowd density within locations of the venue.

14. A communication system, comprising:
a plurality of portable communication devices operated by user attendees of a venue;
a venue database storing a venue registration system associated therewith;
a server communicatively coupled to the venue database, the server having a microprocessor configured to:
register the plurality of portable communication devices using the venue registration system associated with the venue database, the venue registration system providing a plurality of user selectable data privacy thresholds which grant access to private user attendee information based on predetermined venue conditions;
temporarily access the private user attendee information in response to the selected data privacy threshold and the predetermined venue conditions; and
aggregate and perform anonymous data analytics on the temporarily accessed private user attendee information for venue related goals.

15. The communication system of claim 14, wherein the predetermined venue conditions comprise at least one of:
predetermined venue conditions predicted to be met; and
predetermined venue conditions being met.

16. The communication system of claim 14, wherein the microprocessor is further configured to:
determine, based on the registration and predetermined venue conditions, that the temporarily accessed private user attendee information and data analytics are being converted to non-anonymous public data; and
send a notification to the plurality of portable communication devices of the venue pertaining to the non-anonymous public data.

17. The communication system of claim 14, wherein the venue related goals comprise at least one of:
managing occupancy of the venue; and
managing crowd density within locations of the venue.

* * * * *